United States Patent Office 3,578,444

Patented May 11, 1971

3,578,444

METHOD OF MAKING POSITIVE-WORKING LITHOGRAPHIC PLATES BY ELECTROSTATIC IMAGE

Julius L. Silver, Franklin Township, Somerset, N.J., assignor to Union Carbide Corporation No Drawing. Filed June 13, 1968, Ser. No. 736,554
Int. Cl. G03g *13/22*
U.S. Cl. 96—1 9 Claims

ABSTRACT OF THE DISCLOSURE

Method for making positive-working lithographic plates by electrostatic imaging which involves coating an insolubilized olephilic, hydrophobic substrate having admixed therewith a chromium trioxide component with a thin coating of a photoconductive material suspended in a binder, electrostatically charging the coating in the dark, and exposing the charged surface to a light image generated by projection or reflection. Thereupon, the image is devolped by the application of a suitable toner. A solution of a photosensitizing agent is then applied. Exposure of this surface to actinic light causes the light struck areas of the plate to become hydrophilic and oleophobic. The photoconductive material-binder coating can then be removed.

The present invention relates to a method of making positive-working lithographic printing plates directly from copy by image photosensitizing an oleophilic planographic printing plate base having a photoconductive coating which can accept an electrostatic charge. The charge which is applied is lost by photoconduction.

By the term "image photosensitization" is meant that the printing plate surface is photosensitized only in image areas. Non-image areas remain non-photosensitive. Thus the plate so sensitized is capable of producing prints after exposure to light.

Lithographic printing is based on the fact that printing inks encompass hydrophobic oleoginous media which are repelled by surfaces which are wet by water. A lithographic plate consists of areas which are water-wettable and areas which are water-repellent. On a lithographic printing press the plate is wet with water by "molleton" rollers and then by ink carried by ink rollers. An image is formed by the fact that ink adheres only to the water-repellent areas of the plate.

Typically, a lithographic plate is made water-repellent in some areas and water-wettable in other areas by means of the action of actinic radiation passed through a transparency (such as a photographic negative) in close contact with the plate. Such a plate is referred to as being a photolithographic plate. These plates usually consist of a photosensitive coating on a substrate which may be aluminum or treated paper. After exposure to light through a transparency the plate may be processed to remove the coating from areas which are not light-struck. This uncovers the substrate which is made water-wettable by treatment with substances such as gum arabic. The light-struck areas become water-repellent and adhere to the substrate and these areas accept the ink. Other types of plates, such as gelatin-dichromate (collotype) plates or photosensitized poly(ethylene oxide) phenolic resin plates after exposure to light through a transparency are not processed to remove the unexposed coating but rather the unexposed areas are already water-wettable. The exposed areas are rendered water-repellent as a result of chemical changes by the actinic radiation adsorbed.

The process of electrostatic imaging has been utilized in the past for the purpose of preparing lithographic plates directly from copy, i.e. without the use of transparencies.

The basic idea is to charge an electrostatic plate, project the image (from typed, written, printed copy), tone the plate with the attracted particles and then either transfer the toner image to a hydrophilic substrate and fuse onto the substrate or (in some situations) fuse on the toner and treat the elctrostatic plate so that the areas free of toner are rendered water-wettable. For the first case the electrostatic plate is usually amorphous selenium on a metallic substrate and the toner-image is transferred (by electrostatics) to a paper plate coated with a water-wettable surface film. In the latter case the electrostatic plate is usually a coating of zinc oxide dispersed in a resin of high electrical resistivity and the coating is on a conductive substrate. The toner-image is either fused onto the electrostatic coating or absorbed. The plate is made hydrophilic in the non-image areas by chemical treatment.

The aforesaid plates, however, suffer from one or more serious deficiencies which occur during use. These include wear of the toner-image and loss of water-wettability of the nonimage areas. Present day direct plates are good for short runs only, often require special fountain solutions, are easily scratched, and are virtually useless for reproductions other than linework.

Electrostatic plates of the zinc oxide-binder type currently on the market also manifest several drawbacks such as poor non-image areas, unusually short press-life, inability to print good solids and tedious troublesome processing. Also, they depend on the conversion of an oleophilic binder to a hydrophilic state after toning. The binders are not wear resistant to start with and are even less wear resistant after processing.

Recently discovered planographic printing plates having a photosensitizable surface of an association product of an ethylene oxide polymer and a phenolic resin produce outstanding prints in both continuous-tone and half-tone. These plates are photosensitized by coating the entire plate with a suitable photosensitizing agent. The plate is then exposed to light through a negative. Those areas which are exposed to light become hydrophobic. Areas not exposed to light remain hydrophilic. While these printing plates provide many unique advantages, the necessity of employing costly and time-consuming photographic services to obtain the required negative has increased the cost and inconvenience.

In accordance with the present invention there has been found that the foregoing drawbacks are avoided by electrostatically imaging an oleophilic printing plate base coated with a photoconductive material suspended in a binder, with a finely divided toner suspended in a non-solvent organic liquid therefor, and thereafter photosensitizing and exposing the plate to light.

Broadly, the present invention involves a method for making positive-working lithographic plates by electrostatic imaging which involves coating an insolubilized oleophilic, hydrophobic substrate having admixed therewith a chromium trioxide component with a thin coating of a photoconductive material suspended in a binder. Thereupon the plate is electrostatically charged in the dark, preferably by means of a high voltage corona discharge unit. The plate is then exposed to a light image generated by projection or reflection which causes an electrostatic image to form and then developed by the application of a suitable toner. A solution of a photosensitizing agent capable of changing the oleophilic, hydrophobic surface to hydrophilic and oleophobic in the areas of the image is applied. Exposure of this surface to actinic light causes the light struck areas of the plate to become hydrophilic and the photoconductive material-binder coating is then removed with a solvent therefor..

In accordance with the present invention, a positive-working printing plate is provided capable of printing in either half-tone or continuous-tone. Specifically, the printing plate of this invention comprises a substrate such as metal, paper, plastic, and the like, having on its surface a coating of an oleophilic composition. When suitably toned, photosensitized and subsequently subjected to actinic radiation, this coating becomes hydrophilic in the areas struck by actinic radiation and in proportion to the amount of actinic radiation absorbed.

In a more particular aspect, the present invention provides a positive-working printing plate consisting of an oleophilic substrate composition of an association product of a phenolic resin and an ethylene oxide polymer wherein the ethylene oxide polymer has a molecular weight of from 40,000 to ten million inclusive and is present in an amount of from 0.6 to 1.5 parts by weight per part phenolic resin and from 0.06 to 0.25 part by weight per part phenolic resin of a chromium trioxide component.

The ethylene oxide polymer component of this invention is selected from the resinous ethylene oxide polymeric materials having an average molecular weight in the range of from about 40,000 to about 10 million, which are readily soluble in water. The term "ethylene oxide polymers" refers to polymers possessing the repeating unit ($CH_2$—$CH_2O$—) as represented by the class of commercial Polyox resins. The term is intended to include water soluble ethylene oxide polymer resins wherein ethylene oxide is the predominant monomer polymerized therein but which can also contain polymerized residues of other olefin oxides as exemplified by copolymers and terpolymers of ethylene oxide with other copolymerizable monomers containing single epoxide groups such as propylene oxide, butylene oxide, styrene oxide and the like. Poly(ethylene oxide) homopolymer is however preferred as the ethylene oxide polymer resin and shall be used hereinafter as representative of these resins.

The phenolic resin components suitable in the present invention are the heat fusible condensation products of a phenol with an aldehyde. Such condensation products are divided into two classes, resoles and novolaks, either of which can be used in the compositions of this invention as shown hereinafter. These two types of resins are discussed in order below. Both of these classes of phenolic resins will form association products with ethylene oxide polymers.

While these phenolic resins are in the fusible form when making the association product (as hereinafter more clearly set forth) the fusible condition is not necessarily a critical condition of the association product, in which it is possible for a portion or all of the phenolic resin component be fully advanced to the cured state in the substrate.

The fusible resole phenolic resins can advance upon heating to a degree of cure and polymerization to attain a completely insoluble estate. These insoluble phenolics cannot be used in the preparation of the present compositions but are believed to be present in the cured printing plate compositions of this invention. In the preparation of the present compositions only those heat fusible phenolic resins which are soluble in water, and/or organic solvents such as acetone, ethanol and the like or which are sufficiently fusible to permit admixture and association with the ethylene oxide polymers can be used. These resins include those resole phenolic resins which have not cured to a degree of insolubility as well as the novolak resins discussed below.

RESOLE RESINS

Resole resins, are generally produced by the condensation of phenols and aldehydes under alkaline conditions. Resoles differ from novolaks in that polynuclear methylol-substituted phenols are formed as intermediates in resoles. A resole produced by the condensation of phenol with formaldehyde most likely proceeds through an intermedaite having the following illustrated type structure:

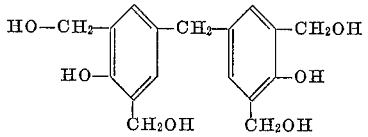

In a typical synthesis, resoles are prepared by heating one mole of phenol with 1.5 moles of formaldehyde under alkaline conditions.

The resole resins are prepared by the condensation of phenol with formaldehyde or, more generally, by the reaction of a phenolic compound, having two or three reactive aromatic ring hydrogen positions, with an aldehyde or aldehyde-liberating compound capable of undergoing phenol-aldehyde condensation. Illustrative of phenolic compounds are cresol, xylenol, ethylphenol, butylphenol, isopropylmethoxyphenol, chlorophenol, resorcinol, hydroquinone, naphthol, 2,2-bis(p - hydroxyphenyl) propane, and the like. Illustrative of aldehydes are formaldehyde, acetaldehyde, acrolein, crotonaldehyde, furfural, and the like. Illustrative of aldehyde-liberating compounds are for example, paraformaldehyde, Formalin and 1,3,5-trioxane. Ketones such as acetone are also capable of condensing with phenolic compounds, as are agents such as hexamethylenetetramine.

The condensation of phenolic compound and aldehyde is conducted in the presence of alkaline reagents such as sodium carbonate, sodium acetate, sodium hydroxide, ammonium hydroxide, and the like. When the condensation reaction is completed, if desired, the water and other volatile materials can be removed by distillation, and the catalyst neutralized.

NOVOLAK RESINS

The novolak resins are prepared in a manner similar to that used to prepare the resole resins. The distinguishing exception in the preparation is however that the reaction is generally conducted in an acidic media, instead of an alkaline media as is the case with the resoles. When less than six moles of formaldehyde are used per seven moles of phenol the products are permanently fusible and soluble. These are the novolak resins. The novolaks have a different structure than the resoles as is illustrated by the novolak condensation products of phenol with formaldehyde.

(a)

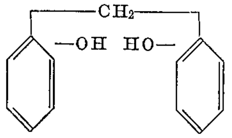

(b)

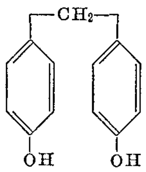

(c)

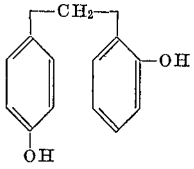

The novolaks can be further reacted with formaldehyde or with a compound such as hexamethylene tetramine, to a state of cure which is similar in nature to the curing pattern of the resoles.

In a typical synthesis novolaks are prepared by heating one mole of phenol with 0.5 mole of formaldehyde under acidic conditions. The temperature at which the reaction is conducted is generally from about 25° C. to about 175° C.

The reactants which can be used in the preparation of the novolaks are the same as those used in the preparation of the resoles which are described and listed above.

While as previously stated, both the resole resins and the novolak resins can be employed in the substrate compositions of the present invention, it is preferred to use the "high 2,2′ novolak resins" since these resins yield more durable printing plates. These resins contain a high percentage of compounds having the structure

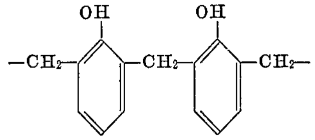

A more complete description of the high 2,2′ novolak resins and their preparation can be found in U.S. Pat. No. 2,475,587 which is hereby incorporated herein by reference.

In actual practice few phenolic resins are purely novolak or purely resole but rather have some degree of each characteristic. That is: most novolaks are slightly insolubilized by heat and most resoles are not completely insolubilized by heat. The high 2,2′ novolaks are more purely novolak than the ordinary type of novolaks. The resoles which are very rich in trimethylolphenol

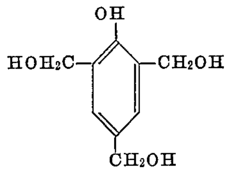

or in methylol groups are more purely resole in character than ordinary resoles. Consequently, because of these properties, various types of positive-working plates can be formulated in this invention which involve only resoles or only novolaks or a combination of both.

The chromium trioxide component ($CrO_3$) of this invention can be used directly as such, or it can be conveniently provided by a water soluble dichromate compound containing the ($CrO_3$) moiety. For example, dichromic acid for the purposes of this invention is defined as having the formula $H_2[CrO_3 \cdot CrO_4]$ and thus contains the chromium trioxide moiety. Similarly, the alkali metal dichromate salts are defined as having the formula $$M_2[CrO_3 \cdot CrO_4]$$

which also contains the ($CrO_3$). For this reason the dichromate compounds are considered to provide chromium trioxide and are intended to be included within the definition of chromium trioxide. Suitable dichromates include dichromic acid, i.e. where M is $H^+$ or $$H_2^{++}[CrO_3 \cdot CrO_4]$$

as well as the alkali metal dichromates, i.e. where M is an alkali metal ion. It should be noted that while ammonia ($NH_3$) is not, per se, an alkali metal its radical $[NH_4]^+$ is frequently treated as a member of this group. For the purposes of this invention ammonia is considered to be a member of the alkali metals and it is intended that it be encompassed within the definition. The alkali metal dichromates include ammonium dichromate $$[NH_4]_2[CrO_3 \cdot CrO_4]$$

lithium dichromate $Li_2[CrO_3 \cdot CrO_4]$, sodium dichromate $Na_2[CrO_3 \cdot CrO_4]$, potassium dichromate $$K_2[CrO_3 \cdot CrO_4]$$

and the like.

The chromium trioxide component is essential to the present invention since its absence causes the printing plate to print negative.

The quantity of the components in the oleophilic composition must be within specific limits in order to provide a printing plate capable of positive printing. The ethylene oxide polymer is used in an amount of from 0.6 to 1.5 parts by weight per part phenolic resin and preferably from 0.9 to 1.1 parts ethylene oxide polymer per part phenolic resin.

The chromium trioxide component is used in an amount of from 0.06 to 0.25 by weight per part phenolic resin and preferably from 0.08 to 0.25 part per part phenolic resin.

It should be noted that chromium trioxide has a different effect on a baked coating of ethylene oxide polymer resin and resole resin than a baked coating of ethylene oxide polymer resin and novolak resin.

When coatings made from ethylene oxide polymer resins and resole resins are baked they are insensitive to almost all solvents. When sensitized and exposed to actinic radiation these coatings are only slightly solubilized to water or solvents such as alcohols or ketones. However, if chromium trioxide is added prior to baking then the baked coatings are slightly solubilized to solvents prior to sensitization and exposure to actinic radiation and very solubilized to solvents after sensitization and exposure to actinic radiation.

If coatings made from ethylene oxide polymer resins and novolak resins are baked, the coatings are soluble to solvents whether sensitized and exposed or not. This is to be anticipated since novolaks are not cross-linkable by heat alone but require the presence of sources of labile formaldehyde which is supplied by additives such as hexamethylenetetramine. If the ethylene oxide polymer resin content is high enough the coatings are also water soluble to some extent.

If chromium trioxide is present then the baked novolak resin based coatings become insensitive to water and other solvents but the sensitized and exposed areas become slightly soluble to water and other solvents. Thus the effect of chromium trioxide appears to have a cross-linking effect on novolaks and the effect of reducing the normal effect of heat on resoles which would ordinarily cause them to cross-link.

Whether the positive-working plate is made with resole or with novolak resins, the coating must be oleophilic to start with. In the case of the novolaks the effect of chromium trioxide is to cause the coating to be insoluble and slightly soluble where sensitized and exposed. If the chromium trioxide is not used then the coating is quite soluble and after sensitization and exposure the entire coating is readily dissolved both in exposed and unexposed areas.

The coating solution is prepared by blending the phenolic resin component, the ethylene oxide polymer and the chromium trioxide component in any suitable blending device and in a suitable solvent such as dimethyl formamide.

The coating can be prepared as a self-supporting film or can be used as a coating on a suitable support. Suitable support materials include sheet metal and foil of such metals as copper, steel, aluminum, zinc and the like; paper, cloth, glass, plastic film and sheet such as polystyrene, polyethylene, polyvinyl chloride and the like. For practical purposes, the coating is generally applied in a thickness of from 0.10 mil to 5 mils.

The coating is then insolubilized or advanced to a degree such that it is insoluble in organic solvents of the type indicated above such as dimethyl formamide. This insolubilization is conveniently effected by heating the coating at a temperature and for a period of time sufficient to insolubilize it. Generally, heating for a period of from about 5 to about 30 minutes at a temperature of from about 120° C. to about 200° C., and preferably at a temperature of from about 140° C. to 180° C., will effect insolubilization of the substrate.

In this invention, this oleophilic substrate on which the photoconductive layer is supported must be relatively conductive for efficient dissipation of the charge when exposed to light. The ethylene oxide polymer-phenolic resin coating is sufficiently conductive and its conductivity can be readily increased, if desired, by incorporation of inorganic salts such as aluminum nitrate, ferric nitrate, zinc acetate and the like. Conductive supports can also be used.

In accordance with the present invention the selected oleophilic material is thinly coated with a photoconductive material, as for example a solution of a resin binder in which the photoconductive material is suspended. The binder of course, promotes the adherence of the photoconductive material to the hydrophilic surface.

The photoconductive materials useful in the practice of this invention are well known in the art and they include such materials as zinc oxide, lead oxide, zinc sulfide, cadmium sulfide, zinc sulfide-cadmium sulfide mixtures, mecuric sulfide, selenium dust, and the like. However, as will be seen later, the photoconductive material must be one which is insoluble in the binder solvent and will not react chemically with the binder.

The photoconductive materials can be treated and/or used with additives such as rose bengal, uranine, bromocresol purple, fluorescein, and the like, so as to vary and enlarge the range of light frequencies to which a photoconductive response is obtained.

In the present invention, it is especially preferred to use zinc oxide as the photoconductive material because of its low cost and effective photoconductivity. The whiteness of the photoconductive material is particularly important in copying since it is difficult to read the copies of dark colored photoconductive materials.

In general practice of electrostatic imaging the choice of useful binders is extremely large. These include polystyrene, silicone resins, acrylic ester polymers, vinyl polymers, alkyd resins, chlorinated rubber, cellulose esters, and the like.

The photoconductive material-binder suspensions are conveniently prepared by dissolving the binder in a solvent and adding the photoconductive material to the rapidly stirred binder solution. A high speed blender such as a Waring Blendor is very efficient and suspensions can be prepared with a one-minute period of working in the blender.

One should avoid the use of a water absorbent binder since water will "short-out" the electrostatic charge, i.e. make it too conductive. Hence, the solvent used to dissolve the binder is preferably one which is high in electrical resistivity and one which will dissolve very little if any water so that the dry coating will retain a static charge. It is preferred that the solvent evaporate off readily so that the coatings need no baking or treatment at elevated temperatures. Illustrative of such solvents are xylene, toluene, cyclohexane and the like.

The ratio of binder to photoconductive material can be varied considerably. For example, ratios ranging from about 1 part by weight of binder to about 30 parts of photoconductive material to about 1 part binder to about 2 parts photoconductive material can be used. A preferred range is about 1 part binder for about 3 to about 20 parts of photoconductive material.

The photoconductive material-binder coating can be applied by any convenient method such as immersion, pouring and draining, whirling, knife-coating, spraying, and the like. However, it is desirable to make the coating as thin as is practical so as to obtain sufficient charge retention and yet be readily removable with simple solvents or water only. Also, a thin coating facilitates penetration of the photosensitizer to the oleophilic subcoat. The coating thickness is readily controllable by the degree of dilution of the binder for a suspension of a given binder to photoconductive material ratio. The photoconductive material-binder coating thickness can vary from a few hundredths of a mil to a few tenths of a mil or more if desired.

After the oleophilic coating is thinly coated with the photoconductive material-binder solution and thereafter electrostatically charged and exposed to an image, the plate is preferably dipped into a suspension of toner particles suspended in a non-solvent organic liquid therefor. This produces a visible image. The action of the light of the projected image discharges the plate in proportion to exposure and the toner particles being opposite in charge are absorbed onto the plate surface. Thus, a plate is obtained with an image made up of toner particles.

The toners suitable for the practice of this invention are commercially available and are of the type ordinarily used in office copying. The toner as used in this invention is not a photosensitizer but rather a substance such as a pigmented resin powder. These generally consist of particles and sizes ranging from about 0.1 micron to about 10 microns and are usually thermoplastics with carbon black therein. A commonly used toner is carbon black-filled polyvinyl chloride.

Toning can be accomplished by various techniques such as by the use of magnetic brush, cascade, aerosol or liquid toners. However, it is preferred to use liquid toners since they are readily absorbed and held by the oleophilic coating whereas the other techniques require a heat fusion step.

After the plate is toned a photosensitizer is applied. This photosensitization step as well as the remaining process steps can be conducted in ordinary light. The photosensitizer has the property such that when absorbed into the plate coating and exposed to actinic radiation, the coating becomes hydrophilic and oleophobic in proportion to the amount of exposure. The unexposed areas of the plate remain oleophilic and hydrophobic.

The photosensitizing agents, useful in the present invention are those which are friable and normally solid at room temperature and which are capable of reaction with the surface of the oleophilic printing plate base upon exposure to light causing it to become hydrophilic. Such photosensitizers are generally assumed to be capable of releasing free radicals or ions upon exposure to light energy at ambient temperatures. Illustrative of such photosensitizers are light sensitive diazo and diazonium compounds, azides, and water-soluble hexavalent chromium compounds. As used herein, the term "diazo" is meant to include diazonium and azido compounds. Illustrative of the classes of photosensitizers are rosin derivatives of diazonaphthol- and diazophenol-sulfonamides; ortho-quinone-diazide; condensation products of diazodiarylamine and formaldehyde; 4,4′-diazidostilbene-2,2′-disulfonic acid salts; azidostyrylketones of the type described in French Pat. No. 886,716 such as 4-azidobenzalacetone-2-sulfonic acid salts; 1,5-diazido-naphthalene-3,7-disulfonic acid salts; 4-azido-naphthalene-1,8-dicarboxylic acid salts; 4,4′-diazido-diphenyl-methane-3,5-dicarboxylic acid salts; 2-diazo-1-hydroxy-naphthalene-5-sulfonic acid salts; para-diazo-dialkylanilines; para-diazo-phenyl-morpholine; para-diethyl amino benzene diazonium fluoborate; 2-methyl benzene diazonium fluoborate; para-fluorophenyl diazonium fluoborate; 1,5-naphthalene tetrazonium fluoborate; ammonium chromate; ammonium dichromate; sodium dichromate; potassium dichromate; and the like; salts such as stannic chloride, ferric chloride, chroium chloride, ferric sulfate, stannic sulfate, and the like; halogenated alkyls containing from one to eight carbon atoms, for example, methyl iodide, methyl bromide, diodomethane, dibromidomethane, iodoform, bromoform, carbon tetraiodide, carbon tetrabromide, bromo ethane diiodoethane, triodoethane, diiododibromo ethane, bromopropane, diodopropane, triiodopropane, hexabromopropane, triiodopentane, triobromohexane, hexaiodo hexane, hexabromoheptane, hexabromo diiodooctane, triiodooctane and the like; the halogenated aryls such as hexaiodo benzene, hexabromo benzene, triiodomethyl benzene and the like; the halogenated alkanols containing from two to eight carbon atoms, such as diiodoethanol, tribromopropanol, triiodomethylpropanol, hexabromobutanol, hexaiodohexanol, hexaiododibromoethanol and the like, halogenated alkyl aldehydes containing from two to eight carbon atoms inclusive, such as iodoacetaldehyde, dibromoacetaldehyde, triiodopropionaldehyde, tribromobutyraldehyde, triiodohexionaldehyde, tetrabromooctinal and the like; the halogenated carboxylic acids containing from two to eight carbon atoms such as tribromoacetic acid, triiodoacetic acid, dibromoacetic acid, triiodopropionic acid, bromopropionic acid, tetraiodobutyric acid, bromochloropentanoic acid, triiodofluorohexanoic acid, triiodotribromooctanoic acid, and the like; halogenated ketones such as those containing from two to fourteen carbon atoms, such as iodoacetone, tribromoacetone, hexaiodoacetone, iodomethylketone, tetraiododiethylketone, hexaiodobutylpropylketone, iodobenzophenone, bromobenzophenone, iodomethylphenone, triiodoethylphenone, hexabromodiethylbenzophenone, and the like.

The quantity of the photosensitizer used in the photosensitive coating should be in an amount sufficient to render the composition photosensitive to light energy. The specific amount necessary to effect the photosensitization desired is depend upon such factors as the photosensitivity of the particular photosensitive component used, the photoresponse desired in relation to a given light source and other such factors.

Generally, a photosensitizing solution of from about 0.1 percent to about 5 percent by weight of photosensitizing agent is suitable for the purposes of this invention.

The photosensitizing agent is applied in solution form consisting of the photosensitizing agent in a suitable solvent therefor. Suitable solvents are those which readily dissolve the photosensitizing agent. Illustrative of suitable solvents for the photosensitizing agents are water, acetone, methanol, methyl ethyl ketone, diethyl ketone, methyl isobutyl ketone, Cellosolve, dioxane, dimethyl formamide and the like.

The photosensitizing solution can be applied to the oleophilic composition by any convenient coating means known to the art such as knife coating, roll coating, brush coating, spray coating, whirl coating and the like.

After the oleophilic substrate has been coated or imbibed with photosensitive solution, the coating is allowed to dry for a period of time sufficient to volatilize the solvent. After the coating is dry the plate is photosensitive to actinic radiation such as light energy and particularly in the ultraviolet range.

The photosensitive printing plate is exposed overall to light.

The actinic radiation can be generated by sunlight, carbon arc light, mercury vapor light or other light source of suitable intensity.

After exposure the plates are washed with water. The plate is then mounted on a standard offset printing press. Those areas of the plate which have not received light are oleophilic and will receive ink. Those areas of the plate which have received light will not accept ink. This plate therefore provides positive prints from a positive photographic transparency or projection.

The mechanism of the photoreactions taking place are not known. It is observed that the photosensitized coating of poly(ethylene oxide) resin, phenolic resin and chromium trioxide become progressively more hydrophilic as exposure to actinic radiation continues. It is also observed that the coating becomes progressively more water soluble with continued exposure. It is presumed that oleophilic components of the coating are modified so as to become solubilized and removeable with water as a result of exposures. The exposure can be stopped at a point where the exposed areas are only slightly solubilized but sufficiently hydrophilic as to allow printing free of scum or toning in the nonimage areas. The printing is thus done on an all-plastic surface and the substrate carrying the coating need not be hydrophilic. However, the exposure can be prolonged to the point where the exposed areas of the coating are completely solubilized. In this case the substrate is uncovered and must therefore be either hydrophilic or easily wettable with water. Such substrate may be treated aluminum.

If the chromium trioxide is omitted in preparation of the coating then the photosensitized plate on exposure to actinic radiation shows only very slight solubilization to water with even prolonged exposure. The plate does not become progressively hydrophilic but rather becomes more and more oleophilic in character.

While not wishing to be bound by any theory of mechanisms, it is believed that the outstanding characteristics of the compositions of the present invention as employed in the preparation and use of half-tone and continuous-tone planographic printing plates are mainly due to the "association" or "complex" formation between the phenolic resin component and the ethylene oxide component. The term "association" refers to the interaction which provides the binding force between the poly(ethylene oxide) compound and the phenolic resin component. It is believed that the interaction involves one or more diverse mechanisms such as hydrogen bonding, electrostatic bonding, secondary valence forces, and the like. It appears that the phenomenon concerning hydrogen bonding can best explain the nature of the interaction. The "associating" or "complexing" interaction between the phenolic resin component and the ethylene oxide polymer component in the compositions might be visualized in the following manner:

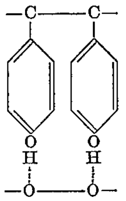

The "association" of the phenolic resin component and the ethylene oxide polymer component causes the formation of a tough, hydrophilic material.

Toner suspensions can be prepared by use of special colloid mills and other means. A simple and effective method is to ball mill the mixture of toner and suspending liquid over a long period of time (24 hours or more). Additives can be used for purposes of increasing viscosity, conferring charge on the particles and for the purpose of causing better penetration of the toner.

Specific embodiments falling within the definition of the process of the invention will be apparent from the following illustrations. It is understood that the illustrations should not be considered to limit the scope of the present invention. In the illustrations, all parts and percentages are by weight unless otherwise specified.

To illustrate the above techniques and principles, the following procedure may be employed. A coating solution can be prepared by dissolving 13 grams of Polyox WSR[1] having a molecular weight of from about 50,000 to about 8 million, 8 grams of a high 2,2′ novolak phenol-formaldehyde resin[2] and 3 grams of hexamethylenetetramine in 300 ml. of N,N-dimethylformamide in a high speed blender.

The blender is run until a clear solution is obtained. After the solution has cooled to room temperature, 1.6 grams of chromium trioxide ($CrO_3$) is added along with 3 grams of the above phenolic resin and the blender is run for 15 seconds. More solvent is added if needed so that the final solution viscosity is between 1000 and 2000 cps. A grained aluminum plate is placed on a whirler and the solution poured on. The plate is then baked at 160° C. for 5 minutes. The finished coating is cured and insoluble in almost all common solvents.

[1] Polyox is a United Carbide Corporation trade name for poly(ethylene oxide) and is soluble in N,N-dimethylformamide as described in U.S. Pat. 3,350,202 (column 9, illustration II).
[2] High 2,2′ novolak phenol-formaldehyde resins can be prepared as described in U.S. Pat. 2,475,587.

Twenty five grams of styrene-butadiene copolymer resin can be dissolved in 175 grams of cyclohexane and placed in a high speed blender. While running at high speed, 75 grams of electrostatic grade zinc oxide is added. After one minute of blending, the suspension is diluted with 825 grams of cyclohexane and stirred for about 10 seconds to give a uniform suspension. This suspension is poured onto the cured coating on the aluminum plate on a whirler running at high speed. The plate is left on the whirler until dry.

The plate is subjected to a 5 milliamps high voltage (9000 volts) corona discharge in the dark. The subject image is projected onto the plate which is then developed by immersing the plate in a toner consisting of a suspension of carbon black-filled polyvinyl chloride. Thereupon, the plate is photosensitized by immersion in a solution suspension of 3 percent sodium dichromate in water-methanol having a ratio by volume of about 4 to 1.

It is then subjected to ultra-violet light until the yellow-orange image becomes brown in color. This required exposure is equivalent or less than that used to expose ordinary presensitized plates.

The plate is wiped with a cloth or sponge wet with a solvent for the binder until the binder and zinc oxide are removed. Methanol, acetone and such are suitable solvents. If the weight ratio of zinc oxide to binder is large (10:1 or more), then the sensitized and exposed plate can be simply wiped with a water dampened cloth or sponge to remove all the zinc oxide and binder and then used for printing. The plate is mounted on a lithographic printing press and inked without any further processing. Press runs of excellent copies are obtainable.

The process of this invention is particularly attractive since a plate can be prepared on any electrostatic copying machine and then simply sensitized, exposed and used for offset printing. Thus a Xerox, C. Brunning, SCM, etc. copier can be used by inserting the plate in the paper feeder followed by inserting the copy in the machine and operating in the usual way. The machine will produce the plate with a toned image. The plate is then rinsed in a photosensitizer solution, dried and exposed and then used for printing.

What is claimed is:

1. Method for making a positive-working lithographic plate by electrostatic imaging which comprises (a) coating an insolublized oleophilic, hydrophobic substrate composition which comprises an association product of an ethylene oxide polymer and a phenolic resin and a chromium trioxide component with a coating which comprises a photoconductive material;

(b) electrostatically charging the coating and exposing the charged surface to a generated image;

(c) applying a toner to the coating;

(d) applying to the toned coating, as a photosensitive agent, a compound capable of releasing free radicals or ions upon exposure to actinic radiation;

(e) exposing the surface to actinic light thereby causing the light-struck areas of the plate to become hydrophilic and oleophobic, and thereafter (f) removing the photoconductive material containing coating.

2. The process of claim 1 wherein the ethylene oxide polymer is ethylene oxide homopolymer.

3. The process of claim 1 wherein the phenolic resin is a novolak resin.

4. The process of claim 1 wherein the photoconductive material is suspended in a binder.

5. The process of claim 1 wherein the toner is a carbon black filled resin.

6. The process of claim 1 wherein the chromium trioxide component is chromium trioxide.

7. The process of claim 1 wherein the chromium trioxide component is dichromic acid.

8. The process of claim 1 wherein the chromium trioxide component is an alkali metal dichromate.

9. The process of claim 8 wherein the alkali metal dichromate is ammonium dichromate.

References Cited

UNITED STATES PATENTS

| | | | |
|---|---|---|---|
| 2,957,765 | 10/1960 | Resetich | 96—1 |
| 2,988,988 | 6/1961 | Kurz | 101—149.2 |
| 3,133,498 | 5/1964 | Michalchik | 101—149.2 |
| 3,309,990 | 3/1967 | Klüpfel et al. | 101—149.2 |
| 3,445,224 | 5/1969 | Bach et al. | 96—1 |
| 3,468,725 | 9/1969 | Uhlig | 148—6.15 |

GEORGE F. LESMES, Primary Examiner

M. B. WITTENBERG, Assistant Examiner

U.S. Cl. X.R.

101—453, 456, 470, 471; 117—17.5; 252—62.1